ates Patent [19]
t'Serstevens

[11] 3,725,558
[45] Apr. 3, 1973

[54] GLASS FURNACE
[76] Inventor: Michel Marie Joseph t'Serstevens, 47 residence Le Festinoy, Ghlin, Belgium
[22] Filed: May 24, 1971
[21] Appl. No.: 146,230

[30] Foreign Application Priority Data
May 22, 1970 Belgium..................................89398

[52] U.S. Cl. ...............................................13/6
[51] Int. Cl. ............................................C03b 5/02
[58] Field of Search.............................................13/6

[56] References Cited

UNITED STATES PATENTS 3,108,149  10/1963  Carney et al. ........................13/6
2,993,079   7/1961  Augsburger..............................13/6
1,656,510   1/1928  Cornelius................................13/6

FOREIGN PATENTS OR APPLICATIONS 36,286    4/1930   France ..........................................13/6

Primary Examiner—George Harris
Assistant Examiner—F. E. Bell
Attorney—Sughrue, Rothwell, Mion, Zinn & Macpeak

[57] ABSTRACT

This invention relates to a glass factory kiln comprising principal heating electrodes which transverse the bed and which, by conductivity, produce the thermal energy which, in normal operation, is necessary to keep a glass bath at the desired temperature.

The kiln furthermore involves auxiliary heating electrodes which traverse the side walls and which, in the upper portion of the glass bath, produce a supporting thermal energy which makes it possible to control the upper level of the glass bath and thus the thickness of the compound layer which is on top of this glass bath.

6 Claims, 4 Drawing Figures

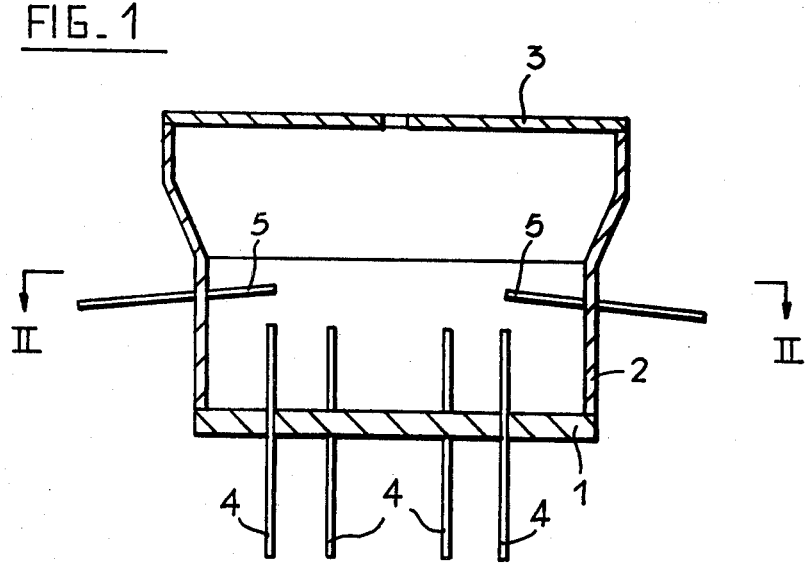
FIG_1
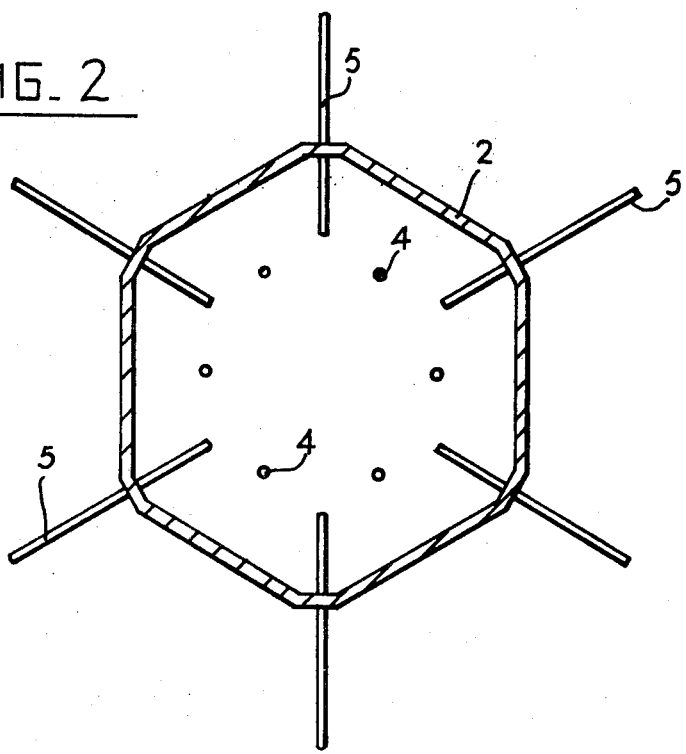
FIG_2

GLASS FURNACE

This invention relates to a glass factory kiln in which a mass of molten glass or a glass bath is normally kept at the desired temperature, under a layer having a solid composition, by the thermal energy produced by the conductivity, through this bath, of electrical currents circulating between heating electrodes.

In known kilns of this type, the heating electrodes traverse the bed of the kiln and extend vertically in the glass bath up to a determined height, below the composition layer. These vertical heating electrodes essentially serve to melt the initial charge of the kiln and then to maintain the temperatures of the glass bath. However, these electrodes do not make it possible to stabilize the upper level of the glass bath, because of the successive charges that are put in during the continuous operation of the kiln. In other words, the electrodes in question cannot by themselves provide control over the height of the glass bath or the height of the composition layer, in spite of the possibilities for regulating the electrical power absorbed by the kiln.

A first objective of the invention consists in a new kiln which effectively guarantees the electro-thermal control of the height of the glass bath in the kiln, depending upon the cadence, the quantity, and the distribution of successive charges forming the composition layer which is on top of this glass bath.

For this purpose the new kiln includes not only principal heating electrodes, which were mentioned before, but also auxiliary heating electrodes mounted on the side walls of the kiln and producing supporting heat energy in the upper portion of the glass bath.

The auxiliary heating electrodes are preferably distributed regularly around the symmetry axis of the kiln.

Generally, the auxiliary heating electrodes are arranged essentially horizontally on the same level.

The auxiliary heating electrodes can advantageously be adjusted in terms of their position with respect to the principal heating electrodes.

On the other hand, the above-mentioned known kilns present a single extraction channel from the glass bath. In these kilns, because of this continuous single and lateral outlet for the molten glass, the heat currents are inevitably oblique and their distribution in the glass bath is entirely unsymmetrical with respect to the axis of the kiln so that inactive zones in this kiln, situated opposite the extraction channel, constantly contain colder glass which can lead to defects in the glass factory products that are turned out.

A second objective of the invention resides in a new kiln which continually guarantees better distribution of heat currents which have become vertical in the center of the kiln. Because of this, the molten glass can be extracted from the kiln at a slower speed than before, with a view to improving the quality of finished products and reducing the wear and tear on the extraction channel. Moreover, better temperature distribution in the glass bath makes it possible thus to eliminate an important source of defects in finished products.

For this purpose, the new kiln presents at least two extraction channels leading out of the glass bath, near the bed and distributed regularly with respect to its axis of symmetry.

In order to be able to heat the molten glass coming out of the kiln, each of these two extraction channels leading from the glass bath involves at least one electrode which heats this glass.

Each heating electrode for a glass extraction channel advantageously runs across the bed of this channel and can be adjusted in terms of height.

Furthermore, conventional glass factory kilns have heating electrodes which get their alternating energy from a three-phase transformer.

A third objective of the invention concerns a new kiln whose heating electrodes, which number six or a multiple of six, are supplied, respectively, by a six-phase transformer whose secondary voltages are advantageously adjustable, by two separate three-phase transformers, by three separate two-phase transformers, or by six separate single-phase transformers.

The use of a six-phase transformer leads to a particularly compact network of current lines in the kiln and improves its yields.

Finally, the usual glass factory kilns have means for putting the compound into the kiln without special programming. These means discharge the compound empirically into the kiln and thus bring about the formation of a compound layer on top of the glass bath which is both irregular and which above all is distributed irrationally as a function of the placement of the heating electrodes.

A fourth object of the invention relates to a new kiln for which the device that puts the solid matter in the compound into the kiln through a charge opening in the side wall of the kiln and penetrates inside the latter with an advance or movement speed controlled on the basis of a reference pattern or template which is homologous to the internal configuration of the kiln. This feature of the charging device can be applied to a kiln with or without arch or vault.

This kind of charging system where the speed of the conveyor belt moving the compound is programmed according to the reference pattern facilitates the control of the uniform or nonuniform distribution of the charge in the kiln by acting upon these speeds according to this pattern, the speed variations in question being furthermore generally proportional to the distance between the end of this conveyor belt and the center of the kiln.

Other details and features of the invention will emerge in the course of the description of the drawings attached to this application which, schematically and by way of example, illustrate two ways of implementing the invention.

FIG. 1 is an axial cross section of a first form of making the kiln according to the invention.

FIG. 2 is a horizontal cross section of this kiln, made along the line II—II in the first figure.

In these various figures, the same reference notations designate identical elements.

Figure 3:
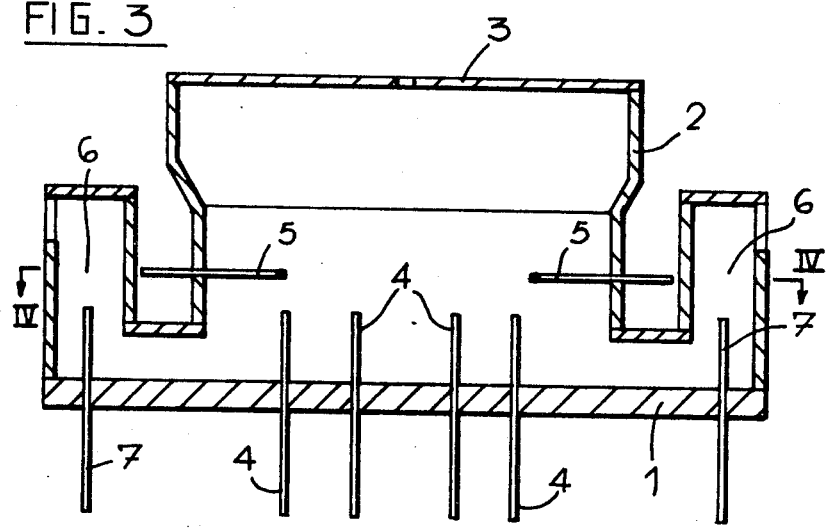
FIG. 3 is an axial cross section of a second version of the kiln according to the invention.
Figure 4:
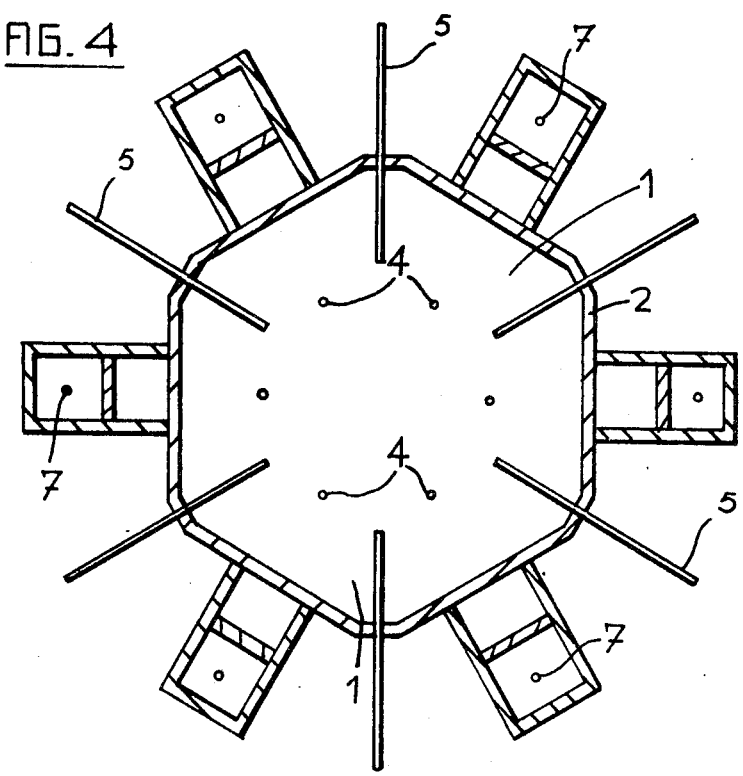
FIG. 4 is a horizontal cross section of this latter kiln, along line IV—IV in the preceding figure.

Either one of the kilns shown is used in the continuous production of molten glass.

In normal operation, a glass bath is kept in the kiln at the desired temperature. A quantity of molten glass is continuously extracted from the kiln while an equivalent quantity of solid compound is poured into the kiln.

The kiln essentially presents a bed 1, side walls 2, and possibly an arch 3. This kiln, for example, presents an internal polygonal configuration or more precisely a hexagonal configuration.

The kiln is charged by a charge device not shown here, including especially an essentially horizontal conveyor belt which receives the solid matter of the compound and which moves this matter into the kiln in order to discharge it there.

For this purpose, the conveyor belt goes through an opening made in side wall 2 of the kiln and penetrates into the interior of the latter with a variable advance or movement speed, generally proportional to the distance from its end to that axis and essentially controlled or programmed on the basis of a reference pattern that is homologous to the internal hexagonal configuration of the kiln.

The determined temperature of the glass bath is maintained in the kiln by means of the dissipation, in this bath, of a thermal energy coming from electrical energy engendered by conductivity from the principal heating electrodes 4.

In the example selected, principal electrodes 4 are six in number. They are regularly distributed around the symmetry axis of the kiln. They go through the bottom 1 and they extend vertically in the molten glass bath, essentially half way up the latter. They are furthermore adjustable in terms of height.

In the first version, the kiln is equipped, along with the principal electrodes 4, with as many auxiliary heating electrodes 5 whose function it is to engender, in the upper portion of the glass bath, a supporting thermal energy with the help of which the upper level of this bath and the thickness of the compound layer on top of the latter are controlled.

In the case considered here and by way of example, auxiliary electrodes 5 are as regularly distributed around the symmetry axis of the kiln that they are equally distant from this axis. They are located respectively along the planes that bisect the angles formed by side walls 2. They are arranged essentially horizontally at the same level situated above the principal electrodes and approximately three-quarters along the height of the glass bath. They go through side walls 2 and are advantageously adjustable in terms of their position with respect to the principal electrodes 4.

The principal electrodes 4 and the auxiliary electrodes 5 are electrically fed by a six-phase transformer. These electrodes 4 and 5 are symmetrically connected in accordance with the nodes and the ends of the voltage diagram of the transformer. In the other case, electrodes 4 and 5 may be connected to separate three-phase, two-phase, or single-phase transformers.

With the help of this kind of electrical connection, electrodes 4 and 5 produce lower current densities than in known equivalent kilns. These current densities create limited temperature differences between the hottest zones and the coldest zones of the new kiln.

Furthermore, the secondary voltages of the six-phase transformer can be adjusted separately so as to be able to distribute, selectively, the energy dissipated in the glass bath and to increase it in a portion of this bath, preferably in the remaining portion.

The molten glass is continuously extracted from the kiln through extraction channel 6 which comes out adjacent to bed 1 and which leads to a glass working machine.

The second version represented here differs from the first one by the presence of several extraction channels 6 through which the molten glass can be taken out, instead of one such channel. The auxiliary heating electrodes need not necessarily be used in the second version although they may be.

In the case selected, the kiln presents six extraction channels 6, arranged regularly around the symmetry axis in the middle or in the midst of side walls 2.

Each extraction channel 6 has a heating electrode 7 which makes it possible to heat the glass flow circulating there as required. Each electrode 7 vertically traverses the bed of the corresponding extraction channel 6 and can advantageously be adjusted in terms of height.

It is obvious that the invention is not exclusively confined to the forms of implementation shown here and that quite a few modifications can be made in the form, the arrangement, and the constitution of certain elements involved in their implementation, provided that these modifications are not in contradiction to the object of each one of the following claims.

I claim:

1. A glass factory kiln comprising:
   a bottom having a vertical symmetry axis,
   lateral walls extending successively above said bottom along a regularly polygonal line centered on said symmetry axis,
   an arch carried by said lateral walls,
   charge openings for charging the solid elements of the compound layer,
   a plurality of extraction channels for extracting the molten glass, said extraction channels being provided in said lateral walls, at the level of said bottom, and being regularly located with respect to said symmetry axis,
   vertical electrodes extending upwards from said bottom into the glass bath and arranged regularly around said symmetry axis, said vertical electrodes producing the main thermal energy necessary for keeping the glass bath at the desired temperature, and
   and horizontal electrodes extending inwards from said lateral walls, all at the same level, into the upper portion of the glass bath and arranged regularly around said symmetry axis, for producing a supplementary thermal energy for controlling the temperature of said upper portion of said glass bath and the thickness of said compound layer.

2. The glass factory kiln of claim 1 wherein said charge openings are provided in said lateral walls.

3. The glass factory kiln of claim 1 wherein said charge openings are provided in said arch.

4. A glass factory kiln as claimed in claim 1 further comprising vertical electrodes extending upwards from the bottoms of the extraction channels into the molten glass contained in said extraction channels.

5. A glass factory kiln comprising:
   a bottom having a vertical symmetry axis,
   lateral walls extending successively above said bottom along a regularly polygonal line centered on said symmetry axis,
   an arch carried by said lateral walls,
   charge openings for charging the solid elements of the compound layer, said charge openings being provided in said lateral walls, extraction channels for extracting the molten glass, said extraction channels being provided in said lateral walls at the level of said bottom and being regularly located with respect to said symmetry axis, vertical electrodes extending upwards from said bottom into the glass bath and arranged regularly around said symmetry axis, said vertical electrodes producing the main thermal energy necessary for keeping the glass bath at the desired temperature, horizontal electrodes extending inwards from said lateral walls, all at the same level, into the upper portion of the glass bath and arranged regularly around said symmetry axis, said horizontal electrodes producing a supplementary thermal energy for controlling the temperature of said upper portion of said glass bath and the thickness of said compound layer, and a device for charging said solid elements of said compound layer through said charge openings, said charging device penetrating into the interior of the kiln at a movement speed controlled with the help of a reference pattern homologous to the internal configuration of said kiln.

6. A glass factory kiln comprising vertical heating electrodes producing the main thermal energy for keeping the glass bath at desired temperature and a device for charging the solid elements of the compound layer through charge openings, said charging device penetrating into the interior of the kiln at a movement speed controlled with the help of a reference pattern homologous to the internal configuration of said kiln.

* * * * *